United States Patent
Takizawa et al.

(10) Patent No.: US 6,179,482 B1
(45) Date of Patent: Jan. 30, 2001

(54) OPTICAL CONNECTOR AND HOUSING FOR OPTICAL CONNECTOR

(75) Inventors: Kazuhiro Takizawa; Toru Arikawa; Yasuhiro Tamaki; Hiroshi Yokosuka, all of Sakura; Kazuo Hogari; Shin-ichi Furukawa, both of Tokyo, all of (JP)

(73) Assignee: Fujikura, Ltd., Tokyo (JP)

( * ) Notice: Under 35 U.S.C. 154(b), the term of this patent shall be extended for 0 days.

(21) Appl. No.: 09/341,554

(22) PCT Filed: Jan. 16, 1998

(86) PCT No.: PCT/JP98/00133

§ 371 Date: Oct. 6, 1999

§ 102(e) Date: Oct. 6, 1999

(30) Foreign Application Priority Data

Jan. 16, 1997 (JP) ...................................... 9-005875

(51) Int. Cl.⁷ ..................................................... G02B 6/36
(52) U.S. Cl. ................................. 385/81; 385/55; 385/60; 385/76
(58) Field of Search ..................... 385/81, 17, 53, 385/56, 58, 59, 60, 64, 72, 76, 77, 78, 83, 84, 85, 86, 88, 92; 439/139

(56) References Cited

U.S. PATENT DOCUMENTS 5,396,572 * 3/1995 Bradley et al. .................... 385/78

* cited by examiner

Primary Examiner—Phan T. H. Palmer
(74) Attorney, Agent, or Firm—Burns, Doane, Swecker & Mathis, L.L.P.

(57) ABSTRACT

An optical connector is provided where an biasing device 26 which biases a ferrule 24 having an optical fiber 22 secured thereinside and a tip end face 23 which has been polished, in a tip end face 23 direction, is located to the rear of a connection mechanism 25 for connecting the optical fiber 22 on the ferrule 24 side and a separately inserted optical fiber 22a, at a rear end side of the ferrule 24 opposite to the front end face 23. The connection mechanism 25 has a construction which uses a mechanical splice, and is opened and closed by a release member inserted into an insertion opening 39 which is opened along an alignment axis direction. Hence the opening and closing operation does not interfere with the biasing device 26, so that operability is improved. Moreover, for this type optical connector there is provided an optical connector housing 21 which accommodates the ferrule. With this optical connector housing 21, by merely inserting the ferrule, the connection mechanism 25 for connecting the pair for optical fibers at the rear end side of the ferrule, and the stop ring 27 accommodating the connection mechanism 25, then assembly can be simply performed so that workability in assembling the optical connector is improved.

8 Claims, 11 Drawing Sheets

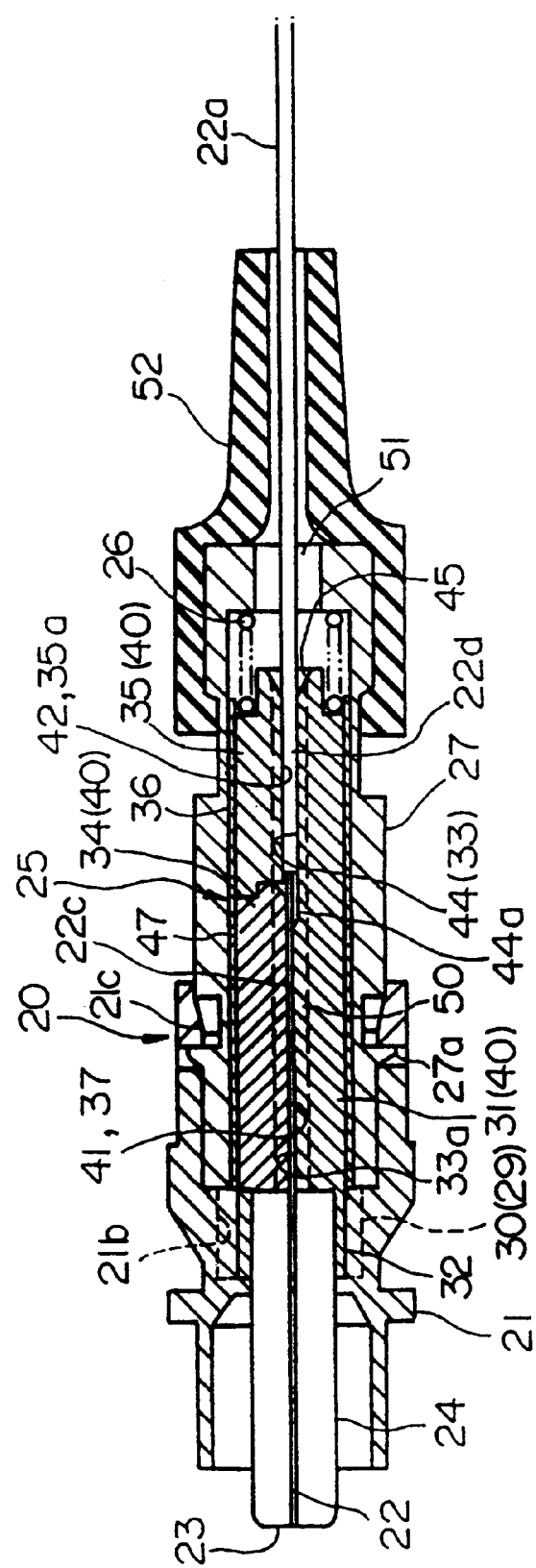

Fig. 14
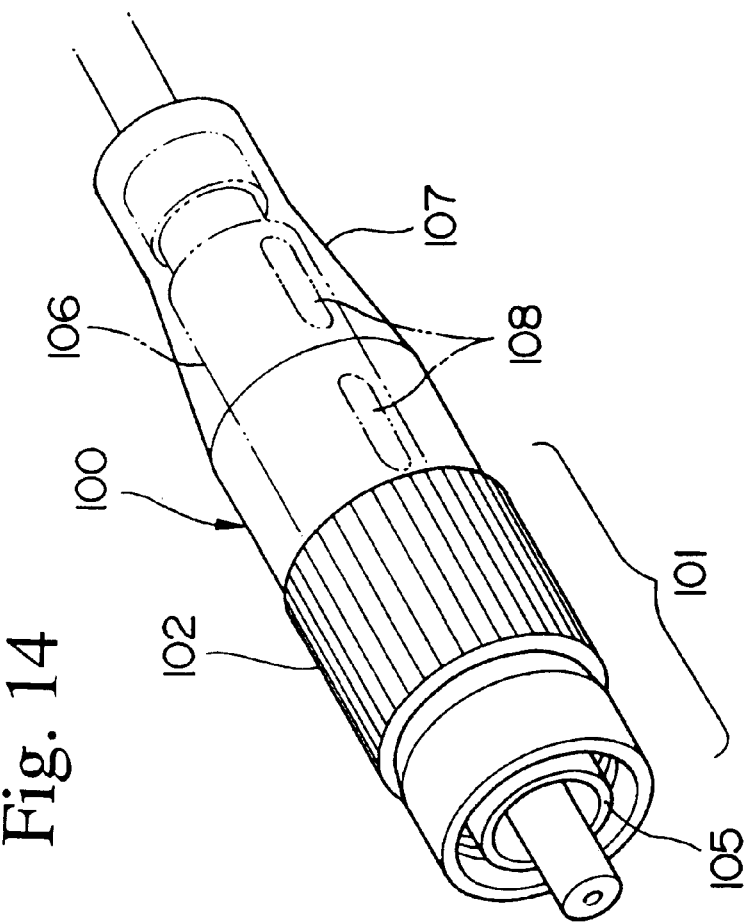
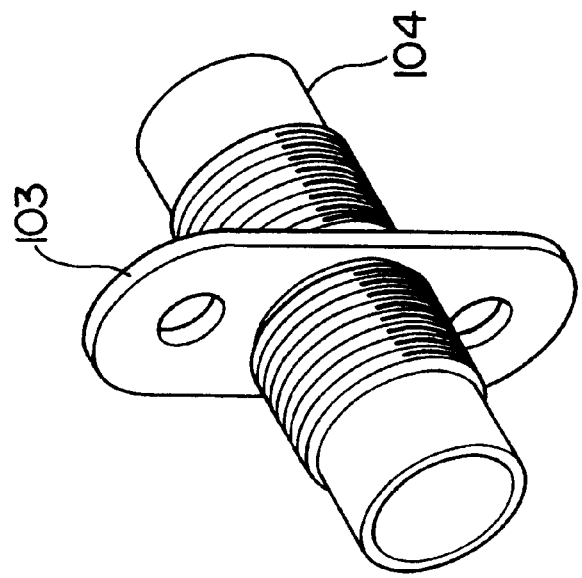

OPTICAL CONNECTOR AND HOUSING FOR OPTICAL CONNECTOR

TECHNICAL FIELD

The present invention relates to an optical connector and to a housing for an optical connector, which can be easily assembled on the end of an optical fiber at a connection site.

BACKGROUND ART

Conventionally, there has been proposed an optical connector for field attachment of a connecting end of an optical fiber, carried out at a connection site away from the factory. Corresponding to this, various types of SC design optical connectors for field attachment have been elaborated.

Field attachment optical connectors are ones in a form where the optical fiber is inserted through and secured to a ferrule which has been previously polished at a tip end, thereby omitting the connector polishing operation after connection.

The connection operation of an optical fiber to an SC design optical connector other than one for field connection, involves a step of previously inserting the optical fiber through the center of all of the connector housing components such as the rubber boot and so on, and after connecting the tip of the optical fiber to the SC ferrule, polishing the connector tip to assemble and finish the overall connector.

With this however, there is a problem in that preparation of polishing equipment at a connection site other than the factory, and execution of the polishing and assembly operation at a site with a poor working environment is undesirable from the point of operating costs and work efficiency.

DISCLOSURE OF THE INVENTION

The present invention takes into consideration the above situation with the object of providing an optical connector which can be easily assembled within a short time at a field connection site.

To achieve the above object, the optical connector of claim 1 comprises; a housing, a ferrule having an optical fiber secured thereinside and a flat tip end face capable of optical connection with another optical component, a connection mechanism located at a rear end side of the ferrule opposite to the tip end face, for positionally aligning and connecting by butt connection and clamping a portion of the optical fiber protruding from a rear end of the ferrule and another optical fiber to thereby maintain a connected condition, wherein the connection mechanism comprising; a hilt portion protruding rearward from the ferrule, a cover which together with the hilt portion clamps therebetween the pair of optical fibers to be butt connected, an alignment device for positionally aligning the pair of optical fibers to be connected between the hilt portion and the cover so as to be able to abut against each other, a clamping force applying device for applying a clamping force to the hilt portion and the cover for clamping the optical fibers, and an insertion opening for insertion of a release member for pressing between and opening the hilt portion and the cover against an biasing force of the clamping force applying device, and the insertion opening is opened to the side along an alignment axis direction of the optical fiber.

With such an optical connector, at first a condition with the release member inserted into the connection mechanism from the insertion opening, and the hilt portion and the cover separated is established. Then in this condition, the optical fiber is inserted from the rear end of the connection mechanism so as to connect by butt connection inside the connection mechanism with the optical fiber on the ferrule side. After this, when the release mechanism is extracted from the connection mechanism, the two abutted optical fibers are clampingly retained between the hilt portion and the cover to thereby maintain the connected condition. In this way, the optical connector can be assembled by merely performing a simple operation. When the release member is inserted into the connection mechanism of the completed optical connector for release, the optical fiber connected to the optical fiber on the ferrule side can be exchanged.

When releasing between the hilt portion and the cover, the release member is inserted into the connection mechanism from the side along the alignment axis direction. In this way, the operability of opening and closing the connection mechanism with operation of the release member is improved. By means of the connection mechanism with the construction including the hilt portion, the connection position of the pair of optical fibers is stably held at a fixed position relative to the ferrule, so that the connection condition of the optical fibers can be stably maintained.

For the alignment device, a construction which adopts for example, an alignment groove formed in one or both of the mutually opposed inner surfaces of the hilt portion and the cover, a microcapillary, or a construction where for example the optical fibers are supported by three precision rods or the like, is also included in the present invention.

The housing for an optical connector of claim 4, constructed so as to be able to accommodate a ferrule having an optical fiber secured thereinside and a flat tip end face capable of optical connection with another optical component, incorporates thereinside an engagement protrusion for accommodation in a location groove formed in a ferrule holder fixed to the ferrule, and a ring portion accommodating socket for accommodating a ring portion protruding from the ferrule holder, and also incorporates an inclined lip for engaging with a ring-shape protruding portion protruding from a stop ring for accommodating a connection mechanism assembled at a rear end side of the ferrule opposite to the tip end face, the connection mechanism being constructed so as to positionally align and clamp the optical fiber protruding from a rear end portion of the ferrule and another optical fiber to thereby maintain an butt connecting condition, and when the stop ring accommodating the connection mechanism is inserted, assembly is effected by accommodating the engagement protrusion in the location groove of the ferrule, accommodating the ring portion in the ring portion accommodating socket, and engaging the ring-shape protruding portion with the inclined lip. When this housing for the optical connector is assembled with the ferrule and the ferrule holder, the engagement protrusion protruding from the inside of the optical connector housing is accommodated in the location groove formed in the ferrule holder, and the ring portion protruding from the ferrule holder is accommodated in the ring portion accommodating socket formed in the inside of optical connector housing. Preferably the ring portion is accommodated in the ring portion accommodating socket with a small amount of clearance so as to be movable. In this way, a small amount of forward and backward movement is permitted relative to the optical component with which the ferrule is to be connected. At this time, the movement of the ferrule holder is guided by the engagement protrusion. Since movement of the ring portion is limited inside the ring portion accommodating socket, then after fitting the optical connector housing, removal of the ferrule is prevented. In this way, with the housing for the optical connector, by assembling the ferrule, the connection mechanism and the stop ring, and inserting into the housing, assembly can be easily effected, thus improving operability in assembling the optical connector.

The optical connector according to claim 5 comprises; a ferrule having an optical fiber secured thereinside and a flat tip end face capable of optical connection with another optical component, a connection mechanism for positionally aligning and butt connecting and clamping the optical fiber protruding from a rear end side of the ferrule opposite to the tip end face and another optical fiber to thereby maintain a connected condition, and a housing for accommodating the ferrule, and an insertion opening for insertion of a release member for opening and closing the connection mechanism is opened on a side face.

For the connection mechanism, for example as with claim 1 a construction is adopted where this comprises; a bifurcated construction component section, an alignment device housed inside the component section for aligning and positioning the pair of optical fibers to be connected so as to be able to be butt connected, a clamping force applying device for applying a clamping force to the component section for clamping optical fibers clamped in the component section, and an insertion opening for insertion of a release member for pressing and opening the component section against an biasing force of the clamping force applying device. The release member is inserted into the insertion opening without interfering with the housing, to thereby open and close the connection mechanism.

With this optical connector, since the insertion opening is exposed to the side face, opening and closing of the connection mechanism by the operation of the release member is easy. Moreover, for the housing, various constructions may be employed such as a construction where the insertion opening is always exposed, or the insertion opening is normally covered but can be easily exposed when used. Consequently, with the optical connector, the stop ring of claim 4, or the push-in control member of claim 6 are not necessary constructional requisites. For example, a construction such as where the connection mechanism itself is exposed to the outside of the housing may also be employed.

The optical connector of claim 6 comprises; a housing, a ferrule having an optical fiber secured thereinside and a flat tip end face capable of optical connection with another optical component, a connection mechanism located at a rear end side of the ferrule opposite to the tip end face, for positionally aligning and connecting by the butt connection and clamping a portion of the optical fiber protruding from a rear end of the ferrule and another optical fiber to thereby maintain a connected condition, a push-in control member which abuts with the ferrule when pushed rearwards in the housing to set a maximum push-in position, and an biasing device for exerting an biasing force on the ferrule towards a tip end of the housing, with a reaction force being taken by the housing or the push-in control member, and the connection mechanism comprises; a bifurcated construction component section, an alignment device housed inside the component section for aligning and positioning the pair of optical fibers to be connected so as to be able to be connected by the butt connection, a clamping force applying device for applying a clamping force to the component section for clamping optical fibers clamped in the component section, and an insertion opening for insertion of a release member for pressing and opening the component section against an biasing force of the clamping force applying device, and the insertion opening is opened to the side along an alignment axis direction of the optical fiber, and the biasing device is located at a rear end side of the connection mechanism opposite to the ferrule, and applies an biasing force on the ferrule via the connection mechanism.

With such an optical connector, at first a condition with the release member inserted into the connection mechanism, and the component section released is established. Then in this condition, the optical fiber is inserted from the rear end of the component section so as to connect by the butt connection inside the component section with the optical fiber on the ferrule side. After this, when the release member is extracted from the connection mechanism, the two abutted optical fibers are clampingly retained inside the component section to thereby maintain the connected condition. At this time, since the biasing device is at the rear end side of the connection mechanism, interference with the operation of the release member is avoided, so that operability is improved. In this way, the optical connector can be assembled by merely performing a simple connecting operation.

By the open and closing operation of the component section using the release member, exchange of the optical fiber for connecting with the optical fiber on the ferrule side is also possible.

For the alignment device, a construction which adopts for example an alignment groove formed in one or both of the mutually opposed inner surfaces of the hilt portion and the cover, a microcapillary, or a construction where for example the optical fibers are kept level with three precision rods or the like, is also included in the present invention.

With the optical connector and the housing for the optical connector of the present invention, after performing the connection operation for the pair of optical fibers in the connection mechanism, it is necessary to verify the connection condition.

For example, as disclosed in Japanese Pending Patent Application No. 8-137206, the member (component section) for clamping the optical fiber in the connection mechanism is preferably made from a resin or glass or the like, having transparent or suitably translucent properties so that the accommodation condition and connection condition of the optical fiber can be verified. Moreover, when a visible light ray is input to the optical fiber after completion of the optical fiber connection, then preferably the leakage light from the connection point of the pair of optical fibers can be observed by eye from outside of the connection mechanism. When the connection mechanism is accommodated for example in the stop ring or the housing, leakage light can be observed by eye, or the leakage light strength can be measured with a measuring instrument, from outside of the stop ring or the housing. In the case where leakage light is minimal, it is judged that the positional displacement between the cores of the connected optical fiber pairs is within a permissible range, while when the leakage light is significant, it is judged that the positional displacement is outside of the permissible range.

The housing for an optical fiber of claim 4 can be adapted for the optical connectors of claims 1, 2, 3, 5, 6, 7 and 8.

Moreover, the construction of the optical connector of claim 6 is also applicable to the optical connectors of claim 1 though claim 4. The construction of claim 2 can also be applied to the optical connector of claim 3.

BRIEF DESCRIPTION OF THE DRAWINGS

FIG. 3 is an elevation sectional view showing the optical connector of FIG. 1.

FIG. 4(a) is an exploded perspective view showing a ferrule and a connection mechanism applicable to the optical connector of FIG. 1, while

FIG. 14 is a perspective view showing an optical connector adapted with a housing for an optical connector for a different situation.

BEST MODE FOR CARRYING OUT THE INVENTION

As follows is a description of a first embodiment of the present invention with reference to FIG. 1 through FIG. 4(a).

Numeral 20 in the figures denotes an optical connector of the embodiment.

Figure 1:
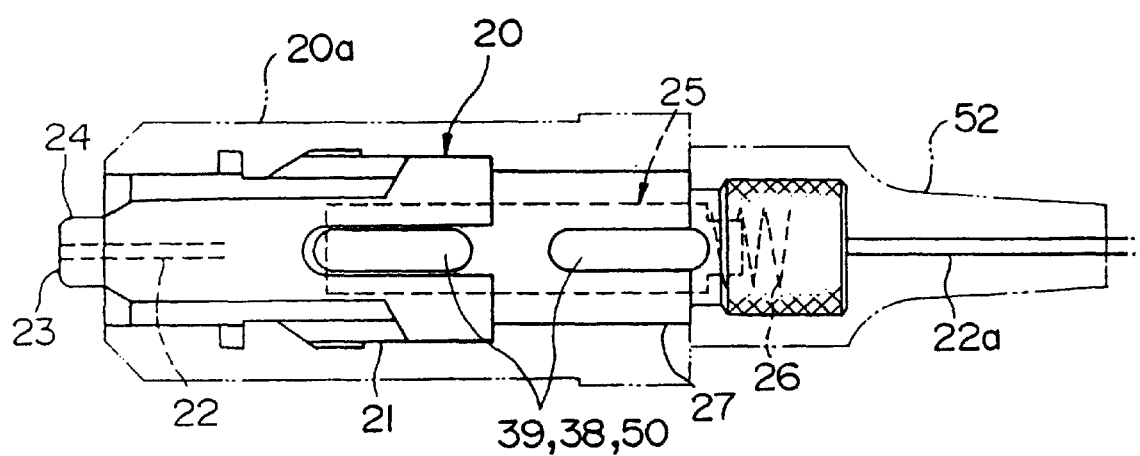
FIG. 1 is an elevation view showing a first embodiment of an optical connector of the present invention.

In FIG. 1, the optical connector 20 comprises; a cylindrical housing 21 (housing for the optical connector), a ferrule 24 with an optical fiber 22 (single core optical fiber) secured thereinside, a connection mechanism 25 located at a rear end side (right side in FIG. 1) of the ferrule 24 opposite to a tip end face 23, which clamps a pair of optical fibers 22, 22a which are connected by the butt connection thereinside to thereby maintain a connected condition, an biasing device 26 (coil spring) located at a rear side of the connection mechanism 25, for exerting a biasing force in a forward direction on the ferrule 24 via the connection mechanism 25, a push-in control member 27 (stop ring) and a knob 20a fitted to the outside of the housing 21. Inside the optical connector 20, the ferrule 24, the connection mechanism 25, the biasing device 26 and the push-in control member 27 are arranged in line in the order shown in FIG. 2, and are assembled in the condition of FIG. 3.

The tip end face 23 of the ferrule 24 is made flat to enable optical connection with another ferrule or the like. For example, this is polished using a polishing apparatus. For polishing, then for example PC (physical contact) polishing or the like is carried out to enable PC.

Figure 4A:
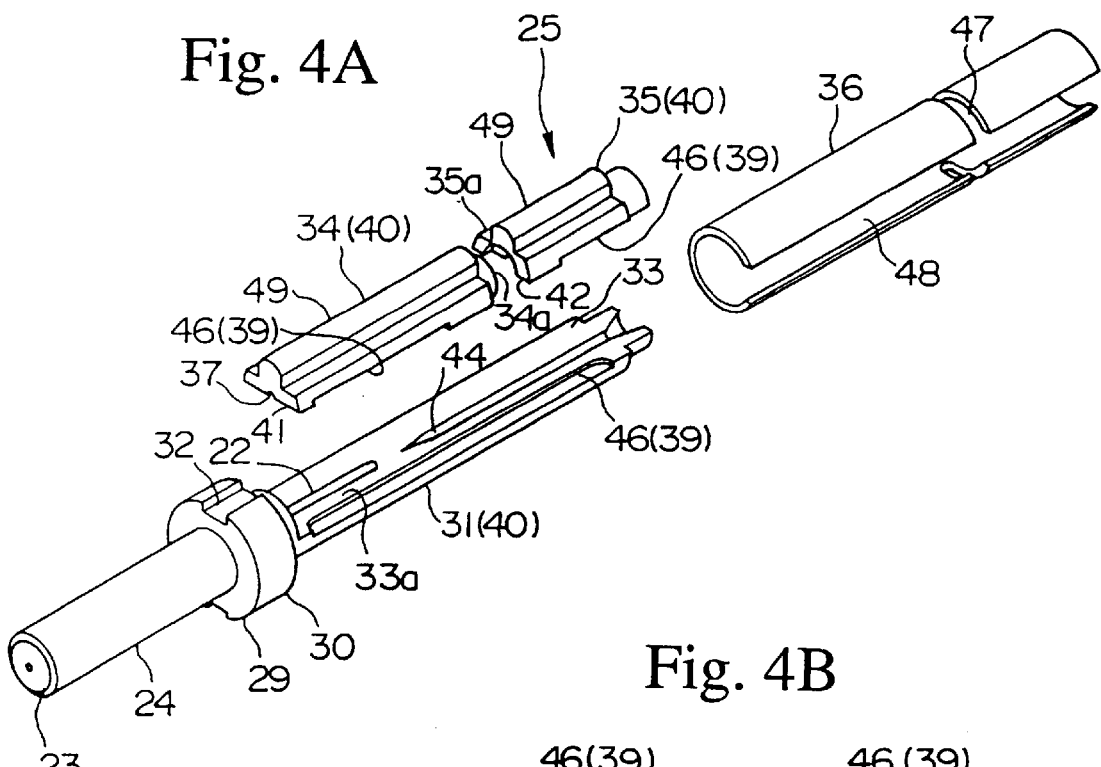
Figure 13:
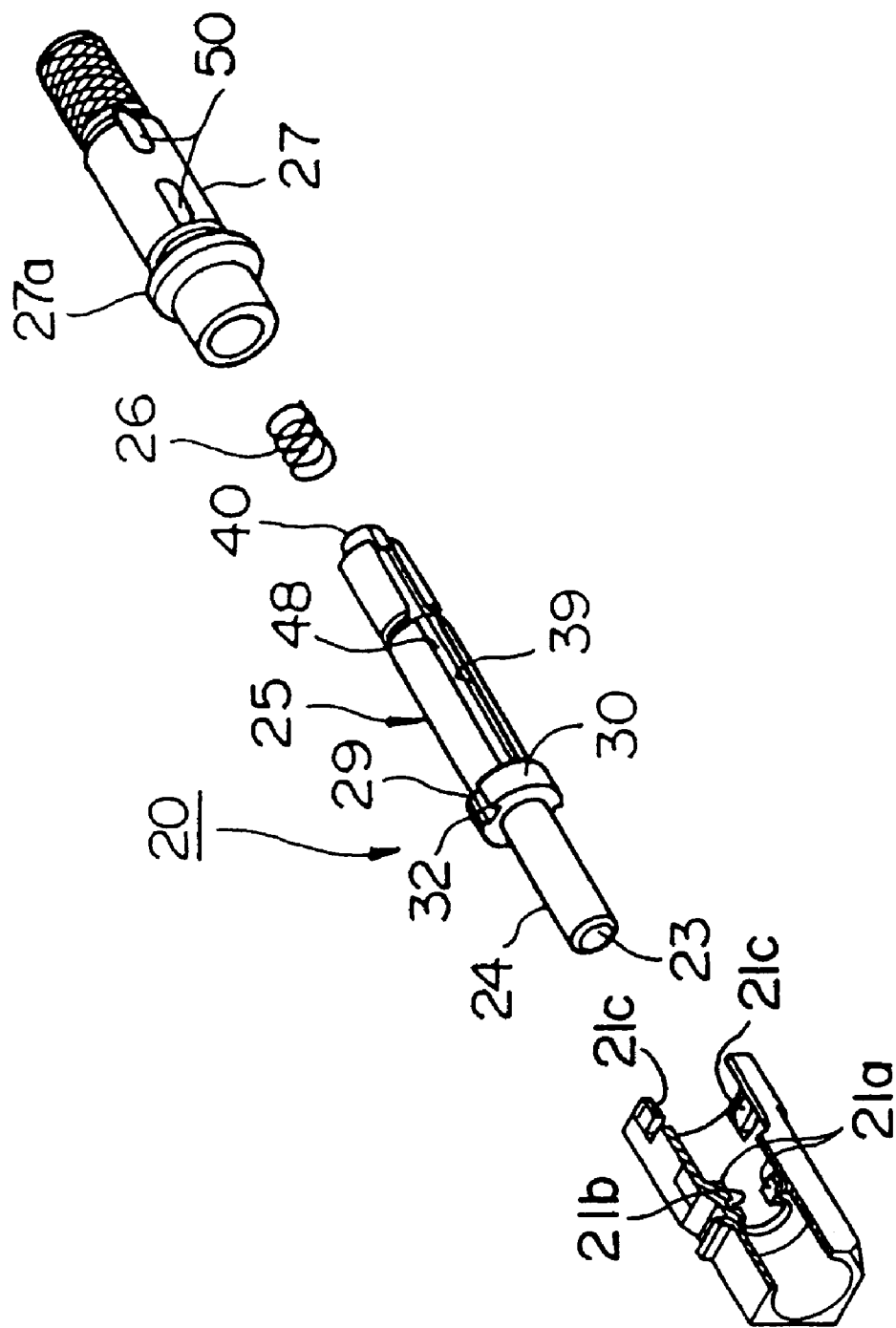
FIG. 13 is an exploded perspective view showing the internal structure of a housing for an optical connector.

As shown in FIG. 3 and FIG. 4(a), the ferrule 24 is formed in a cylindrical shape from zirconia or the like, and the optical fiber 22 is internally secured along the central axis. A ferrule holder 29 is affixed to a lengthwise central portion of the ferrule 24. The ferrule holder 29 is made from a material such as metal having adequate rigidity, and comprises a ring portion 30 affixed to an outer peripheral face of the ferrule 24, and a hilt portion 31 protruding rearward from the ring portion 30. Location grooves 32 formed in the ring portion 30 are engaged with engagement protrusions 21a (refer to FIG. 13) protruding from the inside of the housing 21, to control rotation of the ferrule 24 about its axis and thereby prevent twisting of the optical fiber 22a. Moreover as shown in FIG. 13, the ring portion 30 is accommodated inside a ring portion accommodating socket 21b formed in the housing 21. As shown in FIG. 3, the ring portion accommodating socket 21b accommodates the ring portion 30 with a small amount of clearance, thus permitting a small amount of displacement of the ring portion 30 in the central axis direction of the housing 21. A ring-shape protruding portion 27a which protrudes from the longitudinal end portion of the elongate cylinder shape push-in control member 27 engages with inclined lips 21c which protrude from the rear end portion of the housing 21, thereby controlling displacement of the push-in control member 27 in the rearward direction of the housing 21. The tip end portion of the push-in control member 27 which is located facing the ring portion accommodating socket 21b, sets the movement limit of the ring portion 30 accommodated in the ring portion accommodating socket 21b, in the rearward direction (to the right in FIG. 3).

In assembling together the housing 21, the ferrule 24, the connection mechanism 25, and the push-in control member 27, an assembly with the connection mechanism 25 assembled on the rear end portion of the ferrule 24 and accommodated in the push-in control member 27, is pushed in the insertion direction of the ferrule 24 into the housing 21 towards the ring portion accommodating socket 21b from the inclined lips 21c side, so that the ring-shape protruding portion 27a of the push-in control member 27 engages with the inclined lips 21c. Since the housing 21 is made from a resin such as plastics thus permitting a slight amount of resilient deformation of the inclined lips 21c, then when the push-in control member 27 is inserted into the housing 21, the inclined lips 21c ride over the ring-shape protruding portion 27a while being resiliently deformed and are then engaged. In this way, the ring portion 30 of the ferrule holder 29 is accommodated inside the ring portion accommodating socket 21b inside the housing 21, and the location groove 32 of the ring portion 30 is engaged with the engagement protrusions 21a (refer to FIG. 13) of the housing 21 to give the condition shown in FIG. 3.

Figure 5A:
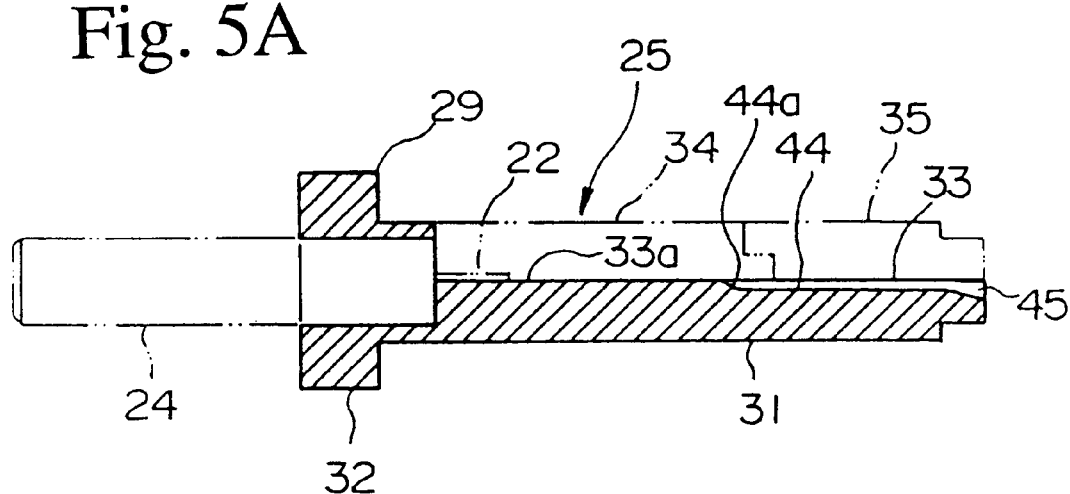
FIG. 5(a) is an elevation sectional view showing a ferrule holder applicable to the optical connector of FIG. 1.

As shown in FIG. 4(a), the hilt portion 31 is rod-like of semicircular shape in cross-section having an upper face 33 positioned close to an extension axis of the central axis of the ferrule 24, and together with covers 34, 35 to be described later positioned on the upper face 33, and a clamping force applying device 36 (C-shaped spring), constitutes the connection mechanism 25. Since as shown in FIG. 5(a), the ferrule holder 29 is an overall integrally formed member, then the hilt portion 31 is always stably supported at a fixed position with respect to the ferrule 24. As a result, the connection stability of the two optical fibers 22, 22a in the connection mechanism 25 is enhanced.

The ferrule holder 29 can be formed from a material such as hard resin, provided this has sufficient rigidity.

Furthermore, the ring portion 30 and the hilt portion 31 may be made from different materials to each other. In this case, preferably the hilt portion 31 is formed from a material which gives high forming accuracy. In this way, alignment accuracy can be improved in the case where an alignment device which uses an alignment groove is adopted.

The connection mechanism 25 comprises; the hilt portion 31, the covers 34, 35 which together with the hilt portion 31 clamp therebetween the pair of optical fibers 22, to be connected by the butt connection, an alignment device 37 (a U-groove formed in the cover 34) for positionally aligning the pair of optical fibers 22, to be connected between the hilt portion 31 and the covers 34, 35, so as to be able to abut against each other, the clamping force applying device 36 for applying a clamping force to the hilt portion 31 and the covers 34, 35 for clamping the optical fibers 22, and an insertion opening 39 (refer to FIG. 2) for insertion of a release member 38 for pressing between and opening the hilt portion 31 and the covers 34, 35 against an biasing force of the clamping force applying device 36.

As shown in FIG. 3 and FIG. 4(a), the hilt portion 31, and the covers 34, 35 constitute a bifurcated rod like component section 40 which positionally aligns and clamps on an alignment axis coinciding with the central axis of the ferrule 24, the optical fiber 22 on the ferrule 24 side and the other optical fiber 22a (single core optical fiber cord) inserted into the connection mechanism 25 from the rear. The covers 34, 35 are arranged in line along the alignment axis of the component section 40.

The covers 34, 35 are formed from hard resin or the like. The cover 34 constituting the alignment device 37 is preferably formed from a material which gives high forming accuracy. In this way, alignment accuracy can be improved in the case where an alignment device which uses an alignment groove is adopted.

Figure 5B:
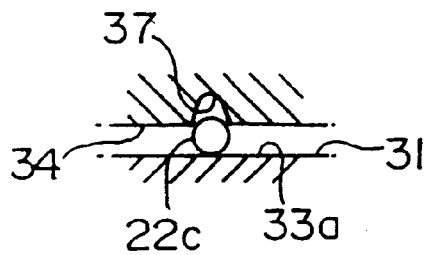
FIG. 5(b) is a sectional view showing the vicinity of a contact region of the connection mechanism.

As shown in FIG. 4(a), the alignment device 37 is a U-groove provided in an opposing face 41 of the cover 34 on the side near the ring portion 30, which opposes the hilt portion upper face 33. As shown in FIG. 5(b), the optical fibers 22, 22a clamped between the front portion of the hilt portion upper face 33 are precisely located and aligned. A region 33a (hereunder "abutting region") of the hilt portion upper face 33 where the optical fibers 22, 22a are butt connected is formed level with a high flatness.

For the alignment device 37, instead of the U-groove, various constructions can be adopted such as; a V-groove alignment groove, a microcapillary, or a construction where the optical fibers 22, 22a are kept level with three precision rods or precision balls.

Figure 4B:
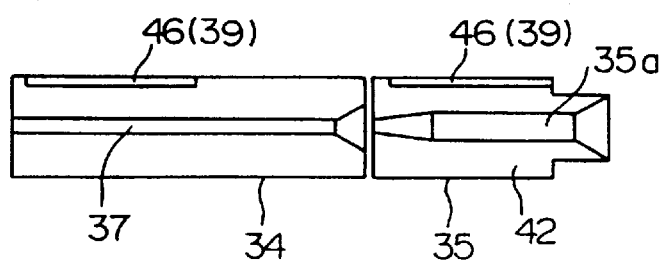
FIG. 4(b) is an undersurface view of a cover constituting the connection mechanism.
Figure 5C:
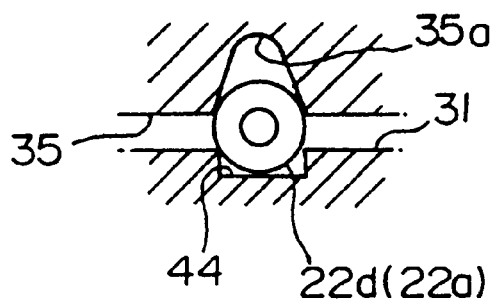
FIG. 5(c) is a sectional view showing near a rectangular groove formed in the connection mechanism.

As shown in FIG. 3 and FIG. 4(b), a U-groove 35a continuing on from the alignment device 37 of the cover 34, is formed in the opposing face 42 of the cover 35 positioned on the rear side of the cover 34. As shown in FIG. 5(c), the U-groove 35a and a rectangular groove 44 formed on the hilt portion upper face 33 facing the U-groove 35a, clamp a covering portion 22d of the optical fiber 22a therebetween. The alignment accuracy between the U-groove 35a and the rectangular groove 44 is lower than that between the U-groove 37, being the alignment device, and the abutting region 33a. The U-groove 35a and the rectangular groove 44 communicate with a tapered aperture 45 in the rear end portion of the component section 40 which serves to induce the optical fiber 22a inserted from the tapered aperture 45 into the alignment device 37 via the U-groove 35a and the rectangular groove 44.

As shown in FIG. 3 and FIG. 4(a), the rectangular groove 44 extends from the tapered aperture 45 to the abutting region 33a, and the end portion on the abutting region 33a side has a tapered portion 44a which becomes shallower going towards the ferrule 24 side.

Instead of the U-groove, a rectangular groove or a V-groove can also be adapted, provided this has the function of inducing the optical fiber 22a into the alignment device 37.

Furthermore, the rectangular groove 44 may be formed in a shape which penetrates into the abutting region 33a as far as the ferrule 24. In this case a sufficient alignment accuracy is maintained between this and the alignment device 37 near the ferrule 24.

The insertion opening 39 comprises the hilt portion upper face 33 and recesses 46 formed on the opposing faces 41, 42 of the covers 34, 35, and is open to the side face of the component section 40.

Figure 2:
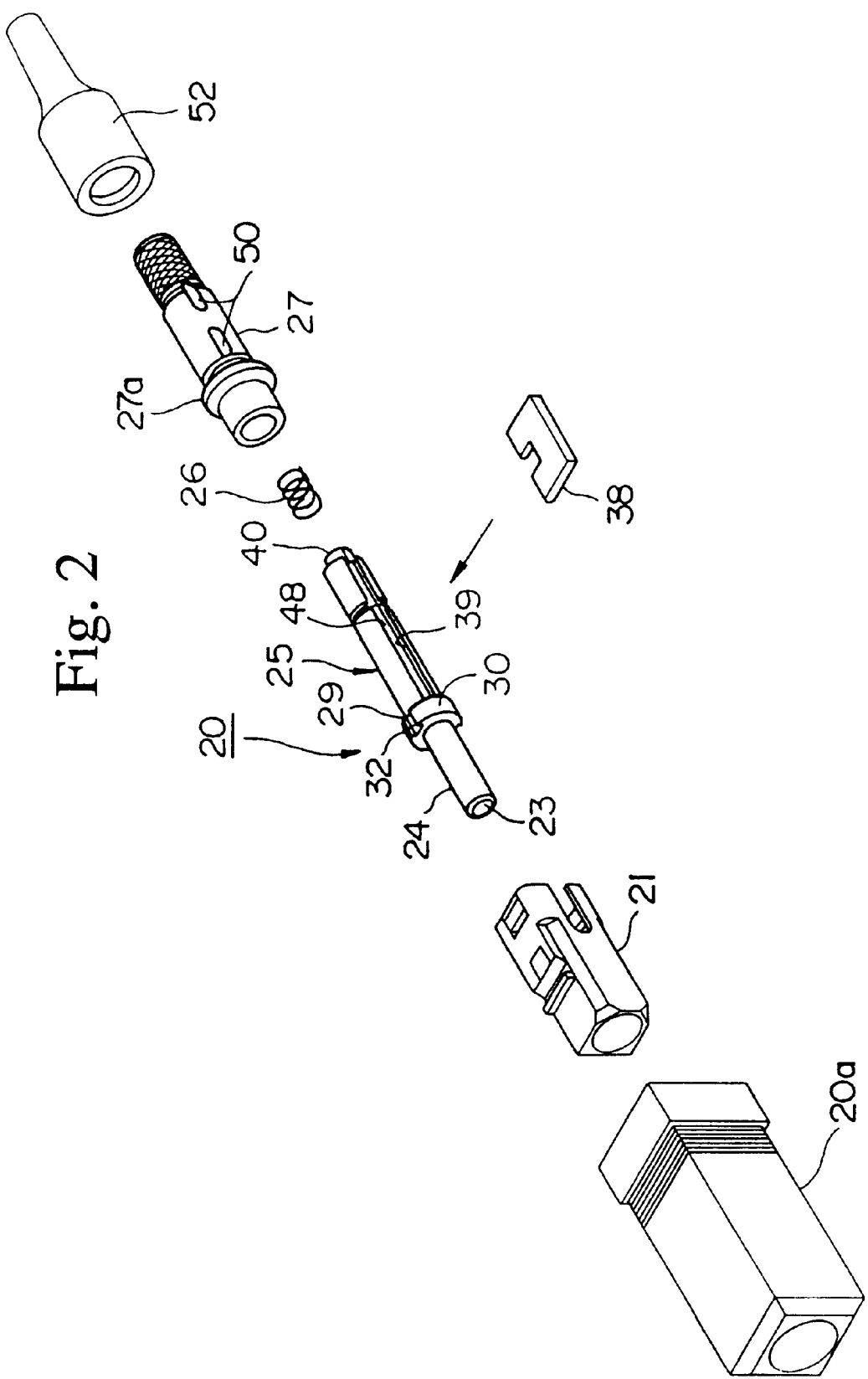
FIG. 2 is an exploded perspective view showing the optical connector of FIG. 1.

The release member 38 is for example a part such as the wedge as shown in FIG. 2.

As shown in FIG. 4(a), the clamping force applying device 36 is a sleeve of spring material formed in a C-shape in cross-section, and by means of a dividing slot 47 formed in the longitudinal central portion of the clamping force applying device 36, clamping forces act individually on parts respectively corresponding to the covers 34 and 35 of the inserted component section 40. That is, on the cover 34 on the ferrule 24 side is protrudingly provided an engaging protrusion 34a which extends the opposing face 41 to the rear side. This engaging protrusion 34a engages in an engagement recess 35a formed in the end portion of the cover 35 on the ferrule 24 side. In this way, the arrangement condition of the two covers 34, 35 can be maintained, and the clamping force of the clamping force applying device 36 can act individually on the covers 34, 35, corresponding to differences in diameter of the optical fiber 22a (the difference in the diameter of a bare fiber 22c and the covered portion 22d, shown in FIG. 3) clamped in the component section 40. Hence the clamping condition of the bare fiber 22c portion can be optimally maintained.

An opening 48 in the clamping force applying device 36 coincides with the insertion opening 39 of the component section 40.

On the outer face of the hilt portion 31 or of the covers 34, 35 is formed a protrusion 49 extending along the lengthwise direction thereof which increases the frictional force with the inner face of the C-shape spring 36 so that rotation of the component section 40 about the rotation axis, inside the clamping force applying device 36 is controlled.

The clamping force applying device 36 is not limited to a C-shape spring, provided that an opening 48 which can communicate with the insertion opening 39 can be obtained. For example, it is possible to adapt a U-shape spring or the like.

Preferably the covers 34, 35 have transparent or translucent properties. If there is positional displacement exceeding a permissible range, between the cores of the optical fibers 22, 22a after connecting in the connection mechanism 25, then when a test light is input to the optical fiber 22 or 22a, the reflected light of the test light produced at the contact point of the two optical fibers 22, 22a leaks via the covers 34, 35. By measuring the strength of this leakage light, the connection condition between the optical fibers 22, 22a can be judged. The leakage light from the connection point leaks to the outside from the covers 34, 35 via the insertion opening 39 of the clamping force applying device 36, and release member insertion apertures 50 (to be described later) in the push-in control member 27 (stop ring), and the strength is measured by a measuring instrument on the outside of the push-in control member 27. If the connection condition is normal (the displacement between the cores of the optical fibers 22, 22a is within the permissible range), the measured leakage light strength will be less than a standard value.

As shown in FIG. 1 and FIG. 3, the biasing device 26 is located at the rear end (on the right in FIG. 1 and FIG. 3) of the push-in control member 27, and biases the ferrule 24 and the connection mechanism 25 to the front. The ferrule 24, the connection mechanism 25, and the biasing device 26 are arranged in line. Moreover, since the biasing device 26 applies an biasing force in the alignment axis direction, an biasing force is applied evenly to the ferrule 24 without the tip end face 23 being inclined, so that in the case where the optical connector 20 is inserted into an optical connector adapter or the like, the optical connection is sound.

As shown in FIG. 2 and FIG. 3, the push-in control member 27 is a cylindrical body which accommodates the connection mechanism 25. The release member insertion apertures 50 for insertion of the release member 38, are formed in a side face central portion of the push-in control member 27. The release member insertion apertures 50 coincide with the insertion opening 39 and the opening 48. By means of these, insertion of the release member 38 into the insertion opening 39 from the outside of the ferrule holder 29 is possible.

Since with the housing 21, the release member insertion apertures 50 are normally exposed, then if the knob 20a is removed from the assembled optical connector 20, the operation of inserting the release member 38 into the release member insertion apertures 50 can be easily performed without interference with surrounding components. Moreover, since the knob 20a is removably fitted so as to also cover the release member insertion apertures 50, then when fitted, the release member insertion apertures 50 are covered up, thus preventing the ingress of dust and the like.

The release member 38 is not limited to the U-shape shown in the figures and various constructions such as a thin wedge shape plate may be adopted. Needless to say, the shape of the release member insertion apertures 50 must be suitably changed corresponding to the shape of the release member 38.

As shown in FIG. 3, a lead in aperture 51 for leading in the optical fiber 22, is formed in the rear end portion of the push-in control member 27. The optical fiber 22a is retained by a rubber boot 52 at the rear of the push-in control member 27, so that external forces such as tensile forces do not act on the portion forward of the rubber boot 52.

With such an optical connector 20, the ferrule 24 comprising the ferrule 24 with the tip end 23 polished, the connection mechanism 25, the biasing device 26, and the push-in control member 27 are assembled beforehand. Then by merely contacting, inside the connection mechanism 25, the optical fiber 22a inserted from the rear into the connection mechanism 25, with the optical fiber 22 on the ferrule 24 side, assembly can be easily and quickly effected. In particular, due to (1) the connection mechanism 25 having an insertion opening 39 exposed to the side along the alignment axis direction (outer peripheral face of the connection mechanism 25), and (2) the biasing device 26 biasing the rear end portion of the connection mechanism 25, the operation of connecting the two optical fibers 22, 22a can be significantly improved.

That is to say, in fitting the optical connector 20 to the tip end of the optical fiber 22a, then with the release member 38 inserted into the insertion opening 39 and the component section 40 open, the optical fiber 22a inserted into the component section 40 is butt connected in the alignment device 37 with the optical fiber 22 on the ferrule 24 side, after which the release member 38 is withdrawn from the insertion opening 39. As a result, the two optical fibers 22, 22a abutted with each other inside the component section 40, are clampingly retained by the clamping force of the clamping force applying device 36, thereby maintaining the connected condition.

At this time, since the insertion opening 39 is open to the side of the connection mechanism 25 along the alignment axis direction, the insertion and extraction operation of the release member 38 at the insertion opening 39 is extremely easy. Moreover since the biasing device 26 is at the rear end portion of the connection mechanism 25, the biasing device 26 does not interfere with the insertion extraction operation of the release member 38. Hence the insertion extraction operation of the release member 38 can be performed very easily.

Furthermore, with the optical connector 20 of the present embodiment, by using the component section 40 with the construction thereof including the hilt portion 31 protruding from the ferrule holder 29, then the optical fibers 22, 22a clampingly retained in the component section 40 are stably supported by the rigidity of the hilt portion 31. Hence the contact condition of the optical fibers 22, 22a can be stably maintained over a long period. In addition, since the alignment axis of the connection mechanism 25 is fixed on the central axis of the ferrule 24, and deformation of the portion of the optical fiber 22 on the ferrule 24 side which protrudes from the ferrule 24 is prevented, then at the time of abutting together the optical fibers 22, 22a, a force abutting the two optical fibers 22, 22a together can be reliably obtained. Moreover, when the optical fibers 22, 22a are clampingly retained inside the connection mechanism 25, there is no concern of a stress being produced in the optical fiber 22. Hence the target connection loss between the connected optical fibers 22, 22a can be reliably obtained.

Moreover since with the connection mechanism 25, the clamping force of the clamping force applying device 36 acts individually for the alignment device 37 and components other than this, then as shown in FIG. 3, in the case where the bare fiber 22c portion of the optical fiber 22a inserted into the alignment device 37 and the covered portion 22d portion rearward of this differ in diameter, the result is also obtained that even in the case where vibration is applied to the optical fiber 22a, the contact condition of the pair of optical fibers 22, 22a in the alignment device 37 can be stably maintained.

Furthermore, with the construction where the optical fibers 22, 22a are clamped between the two covers 34, 35 and the hilt portion 31, then compared to a construction where for example the optical fibers 22, 22a are clamped between a bifurcated hilt portion protruding from the ferrule holder 29, it is easier to form the alignment groove functioning as the alignment device, and the guide groove for leading the optical fiber 22a into the alignment groove. Moreover it is easy to ensure shape accuracy, with the result that and cost can be reduced.

With the optical connector 20 of the present embodiment, when the release member 38 is inserted into the connection mechanism 25 of the completed optical connector 20, the optical fiber 22a for connecting to the optical fiber 22 on the ferrule 24 side can be easily exchanged.

As follows is a description of a second embodiment of an optical connector of the present invention with reference to FIG. 6 through FIG. 9.

In the figures, structural components the same as for FIG. 1 through FIG. 4(a) are denoted by the same symbols and their description is abbreviated.

Figure 6:
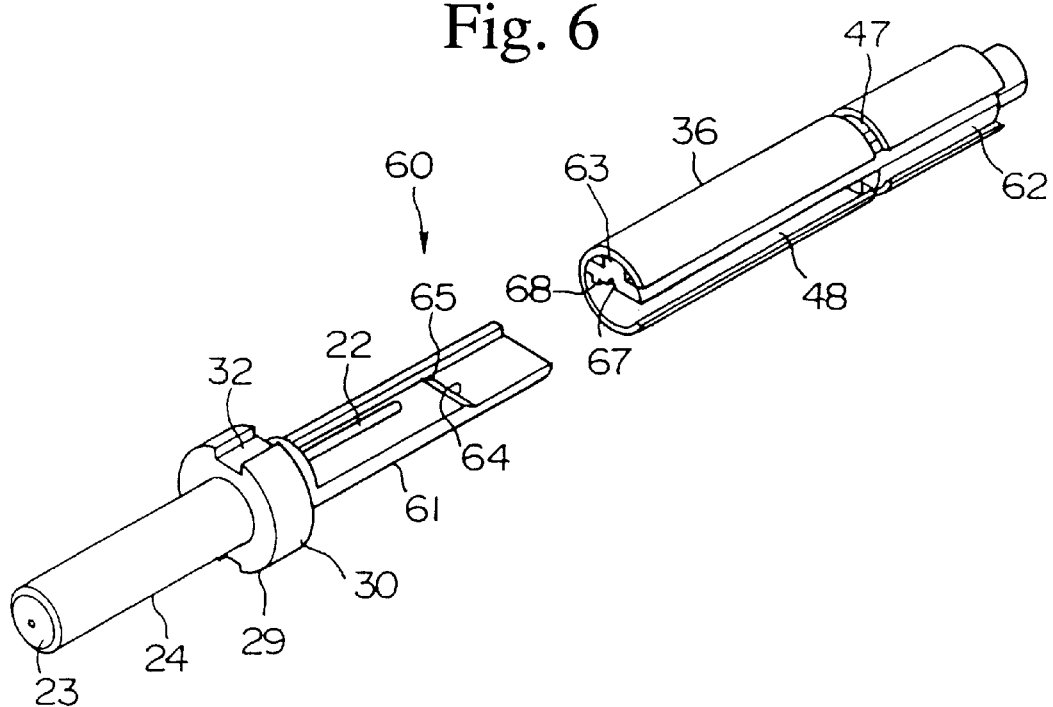
FIG. 6 is a diagram showing a second embodiment of an optical connector of the present invention, being an exploded perspective view showing a ferrule and a connection mechanism.
Figure 7:
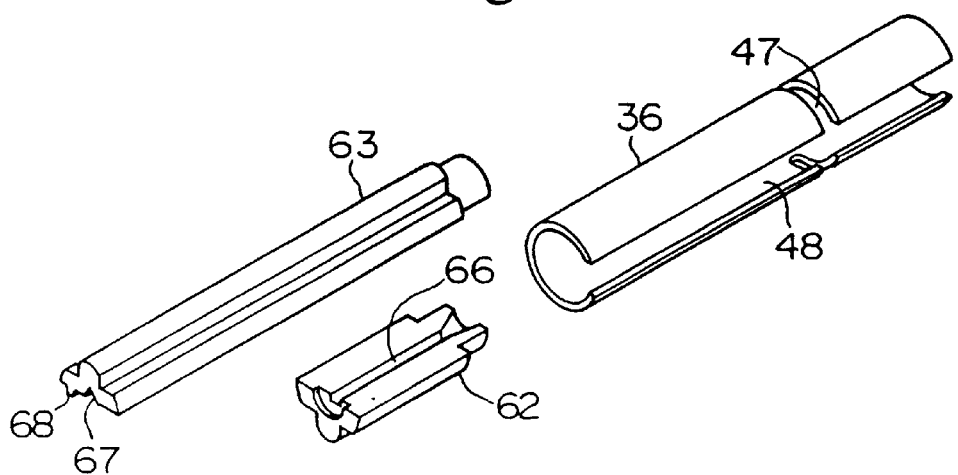
FIG. 7 is an exploded perspective view of the connection mechanism of FIG. 6.

In FIG. 6 and FIG. 7, numeral 60 denotes a connection mechanism. The connection mechanism 60 comprises a hilt portion 61, a short cover 62 arranged on a rear side of the hilt portion 61 (on the right in FIG. 6 and FIG. 7), a long cover 63 arranged so as to marry together the hilt portion 61 and the short cover 62, and a clamping force applying device 36.

The hilt portion 61, the short cover 62, and the long cover 63 constitute a bifurcated component section which positionally aligns the optical fibers 22, 22a in an butt connected condition on an alignment axis coinciding with the central axis of the ferrule 24.

As shown in FIG. 6, a rear portion inclined step 64 and a guide groove 65 extending from the inclined step 64 to near a ring portion 30, are formed on the hilt portion 61. As shown in FIG. 7, a guide groove 66 (rectangular groove) is formed in the short cover 62, and an alignment device 67 (V-groove) and a guide rib 68 are formed in the long cover 63. By inserting the guide rib 68 into the guide groove 65, the long cover 63 is located with respect to the hilt portion 61. With the long cover 63, since sliding movement is permitted with respect to the hilt portion 61 in the alignment axis direction, then insertion and extraction of the long cover 63 in the alignment axis direction, and location at the time of insertion is facilitated, thus simplifying assembly and disassembly of the connection mechanism 60.

The forward portion of the long cover 63, and the hilt portion 61, constitute an alignment device which uses the alignment device 67, while the rear portion of the long cover 63, and the short cover 62 constitute a guide portion for inducing the optical fiber 22a inserted from the rear of the connection mechanism 60 into the alignment device by means of the overlapped guide groove 66 and alignment device 67. The optical fiber 22a is smoothly fed from the guide portion to the alignment device, with the alignment accuracy being increased by the inclined step 64. With the assembled connection mechanism 60, the inclined step 64 forms a small gap between itself and the long cover 63, and this small gap functions as an insertion opening for inserting a release member 38.

Figure 8:
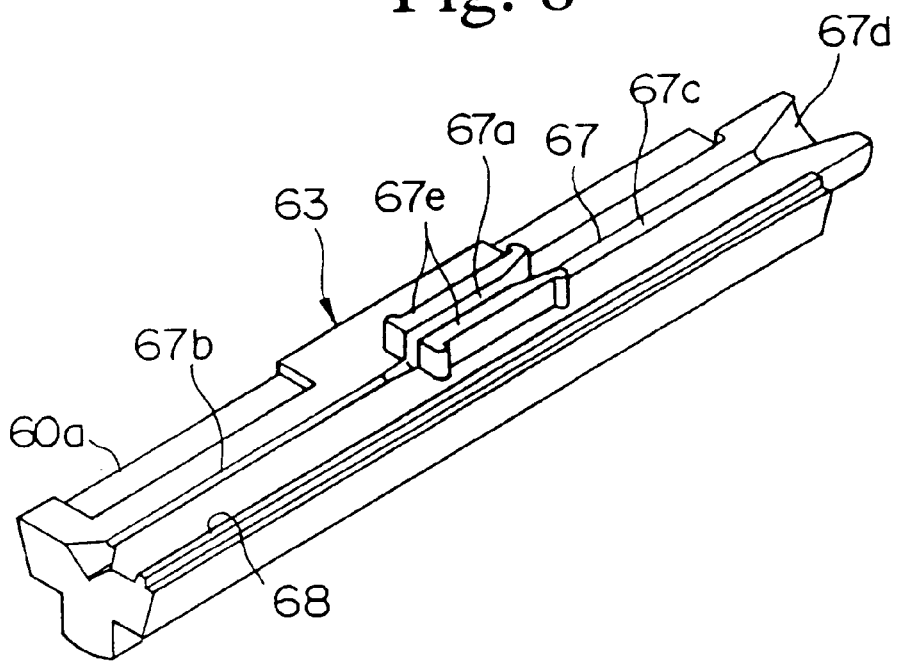
FIG. 8 is a perspective view showing a long cover constituting the connection mechanism of FIG. 6, in particular showing the construction of a V-groove which is employed as an alignment device.
Figure 9:
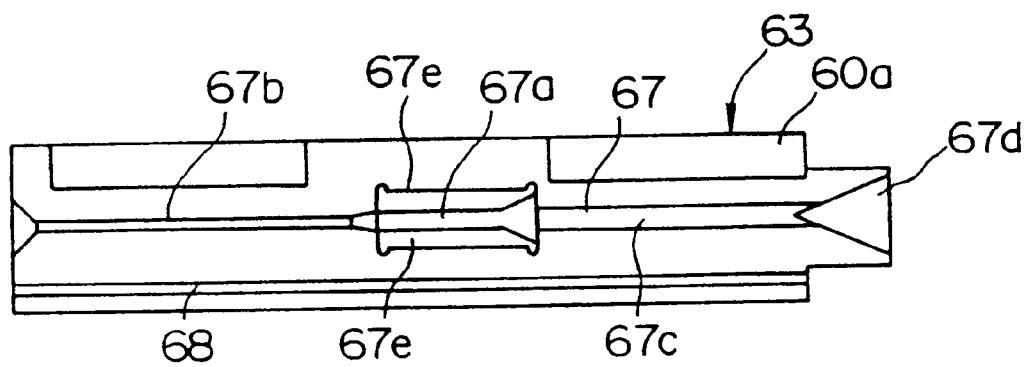
FIG. 9 is an undersurface view showing the long cover of FIG. 8.

FIG. 8 and FIG. 9 show the V-groove 67 of the long cover 63 and the vicinity thereof.

In FIG. 8 and FIG. 9, the V-groove 67 is formed lengthwise in the long cover 63. With the V-groove 67, the ferrule 24 side (left front side of FIG. 8, left side of FIG. 9) from a tapered alignment accuracy changing section 67a formed in the longitudinal central portion, is an alignment groove 67b which functions as an alignment device 67. The portion on the opposite side to the alignment groove 67b is a guide groove 67c with a lower alignment accuracy than the alignment groove 67b. The construction is such that an optical fiber 22a inserted from an optical fiber lead-in opening 67d formed in a tapered shape in a tip end of the guide groove 67c, is led into the alignment groove 67b via the guide groove 67c and the alignment accuracy change section 67a. The alignment accuracy change section 67a is formed between a pair of protruding walls 67e standing on opposite sides of the V-groove 67, so that the alignment accuracy of the optical fiber 22a inserted in the ferrule 24 direction from the guide groove 67c, is gradually increased as the optical fiber 22a is fed to the alignment groove 67b.

Symbols 60a in FIG. 8 and FIG. 9 denote insertion openings for insertion of the release member 38 to open the connection mechanism 60.

Figure 10:
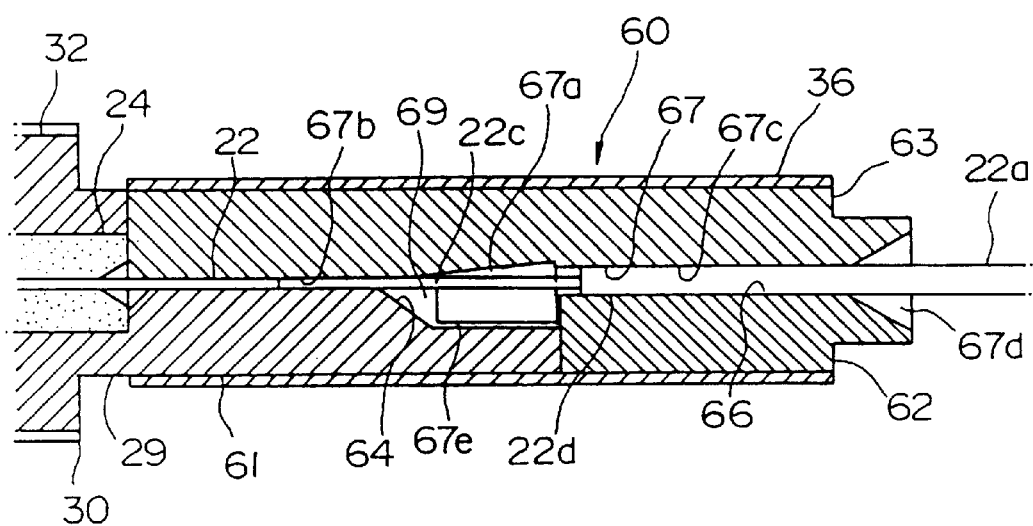
FIG. 10 is an elevation sectional view showing the connection mechanism of FIG. 6.

As shown in FIG. 10, when the connection mechanism 60 is assembled, the protruding walls 67e are fitted into a recess 69 formed between the inclined step 64 of the hilt portion 61 and the short cover 62, and the long cover 63 is located relative to the hilt portion 61. As a result, the optical fiber 22a fed into the guide grooves 66, 67c from the optical fiber lead-in opening 67d passes through the recess 69 while being guided by the two the protruding wall 67e and is fed smoothly to the alignment groove 67b.

With the optical connector of this embodiment, since it is not necessary to form the groove for guiding the optical fiber 22a, in the hilt portion 61, manufacture is simplified thus reducing cost. Moreover, assembly and disassembly is facilitated, with the result that assembly time can be shortened.

Needless to say, the guide groove 66 and the alignment device 67 are not limited to the groove shapes shown in the figures, and grooves of various cross-sectional shapes can be adapted.

As follows is a description of a third embodiment of an optical connector of the present invention with reference to FIG. 11 and FIG. 12.

In the figures, structural components the same as for FIG. 1 through FIG. 6 are denoted by the same symbols and their description is abbreviated.

Figure 11:
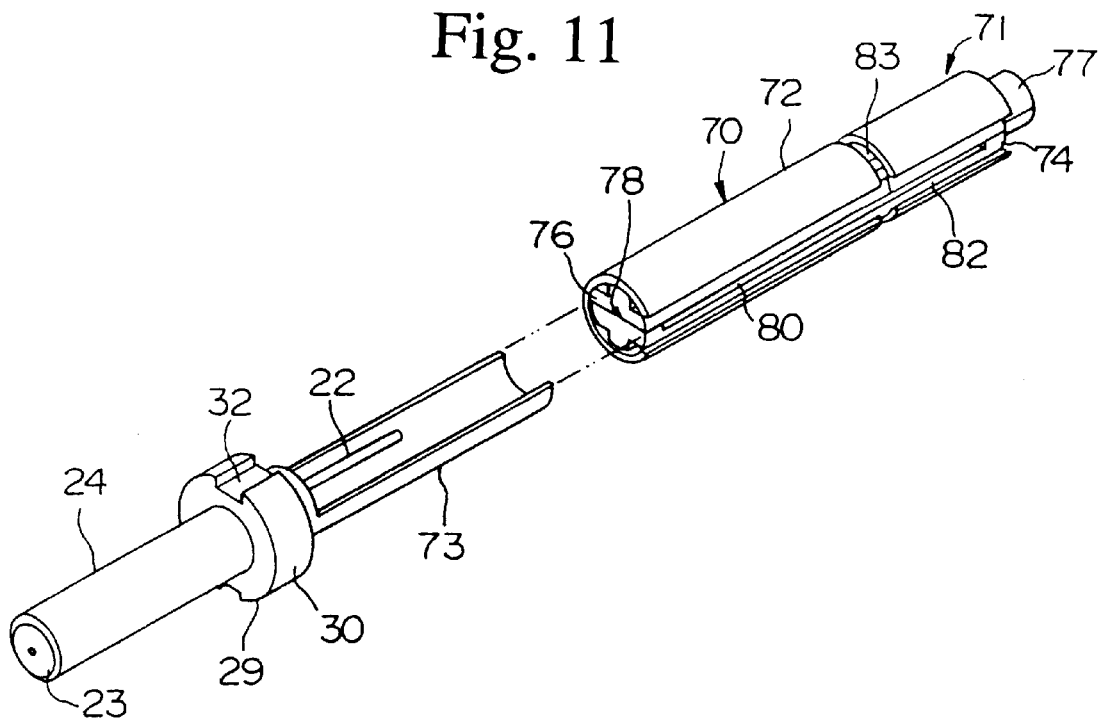
FIG. 11 is a diagram showing a third embodiment of an optical connector of the present invention, being an exploded perspective view showing a ferrule and a connection mechanism.
Figure 12:
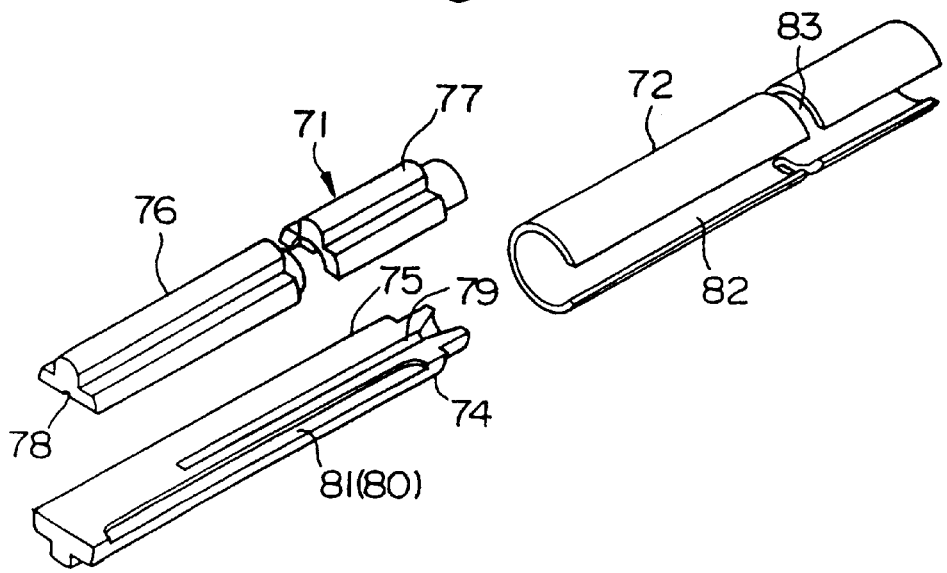
FIG. 12 is an exploded perspective view showing the connection mechanism of FIG. 11.

In FIG. 11 and FIG. 12, numeral 70 denotes a connection mechanism. With this connection mechanism 70, the construction is such that a bifurcated rod like component section 71 is inserted inside a clamping force applying device 72 (C-shape spring) in the form of a C-shape cross-section sleeve. The component section 71 is mounted on a hilt portion 73 in the form of a half cylinder shape, which protrudes from a ferrule holder 29, and the hilt portion 73 and the component section 71 are internally retained as one inside the clamping force applying device 72 so that two butt connected optical fibers 22, 22a are clampingly retained on an alignment axis coinciding with a central axis of a ferrule 24.

The component section 71 comprises a long cover 74, and the two short covers 76, 77 mounted in line on an upper face 75 of the long cover 74. The long cover upper face 75, in particular the front portion (lower left in FIG. 11, FIG. 12) is formed level with a high flatness. By clamping the optical fibers 22, 22a between this front portion and an alignment device 78 (U-groove) formed in the short cover 76 mounted thereon, the optical fibers 22, 22a are precisely located and aligned. Moreover, on a rear portion rearward from the central portion of the long cover upper face 75, is formed a guide groove 79 (U-groove) for leading the optical fiber 22a from the rear of the component section 71 into the alignment device 78. In a side portion of the long cover upper face 75 is formed a recess portion 81 (refer to FIG. 12) constituting an insertion opening 80 (refer to FIG. 11) for a release member 38. The insertion opening 80 is opened in the side face of the component section 71 and coincides with an open portion 82 of the C-shape spring 72 fitted to the outside of the component section 71.

The C-shape spring 72 is divided into two regions which function as separate springs corresponding to the respective short covers 76, 77, by means of a dividing slot 83 formed in a longitudinal central portion.

With the optical connector of this embodiment, since the construction connects and clamps the optical fibers 22, 22a inside the component section 71 which is separate from the ferrule 24 and the ferrule holder 29, then the manufacturing accuracy of the ferrule holder 29 can be relaxed, so that cost can be even lower. That is to say, since an alignment section such as a groove is not formed in the hilt portion 73, then there is no longer the need for the process of precisely machining away the hilt portion 73 from the ferrule holder 29, so that formation of the hilt portion 73 is simplified. On the other hand it is easy to obtain forming accuracy for the component section 71 and hence manufacturing costs for the optical connector can be reduced.

Moreover, since the construction positions and aligns the optical fibers 22, 22a inside the component section 71 for the optical fibers 22, 22a, then improvement of alignment accuracy is facilitated, and the target connection loss can be reliably obtained.

Since the component section 71 and the ferrule holder 29 are separate, the grooving process of the component section 71 is simplified. Hence a groove for clamping and aligning the bare fiber 22c between the alignment device 78 can be formed in the long cover 74 as a continuation of the guide groove 79.

With the beforementioned respective embodiments, the construction was shown for where the alignment axis of the connection mechanisms 25, 60, 70 coincided with the central axis of the ferrule 24. The present invention however is not limited to this, and also includes constructions where the alignment axis of the connection mechanism does not coincide with the central axis of the ferrule 24.

The biasing device 26 is not limited to a coil spring, it being possible to adapt other springs such as a plate spring.

The housing applicable to the optical connector of the present invention (optical connector housing) is not limited to that of the beforementioned embodiments, and various constructions can be employed. For example, constructions for connecting to other optical connectors (including optical connector adapters, optical connector plugs, optical connector jacks, optical connector receptacles and the like), and constructions for maintaining the abutment force between ferrules, can be appropriately modified.

More specifically, for example a construction where a groove formed in the housing is inserted into and engaged with a pin protruding from an optical connector adapter, and the abutting together force on the ferrule pair is maintained by the biasing force of an internally housed spring (a so called ST type optical connector), or a construction where the housing is threadedly fitted to an optical connector adapter and the abutting together force on the ferrule pair is maintained by the biasing force of an internally housed spring (a so called FC type optical connector: Fiber transmission system optical connector) or the like may be employed. Moreover constructions where various housings (optical connector adapters) can be fitted and removed with respect to the ferrule, the ferrule holder, the connection mechanism, or the stop ring can also be employed.

FIG. 14 shows an example where the present invention is applied to the beforementioned FC type optical connector.

As shown in FIG. 14, a housing 101 of this optical connector 100 (optical connector plug) is of cylindrical shape and is threadedly fitted to a male threaded sleeve 104 of an optical connector adapter 103, by turning a coupling nut 102. A positioning sleeve 105 for engaging with and locating the male threaded sleeve 104 is housed inside the housing 101, so that when the optical connector 100 is connected to the optical connector adapter 101, both components are smoothly located. In FIG. 14, numeral 106 denotes a stop ring built into the connection mechanism. When a bush 107 is removed, not only is a release member insertion aperture 108 formed in the stop ring 106 exposed but also an insertion opening (not shown in the figure) formed in the connection mechanism is exposed by communication with the release member insertion aperture 108. Hence the release member can be inserted into the insertion opening to open and close the connection mechanism.

What is claimed is:

1. An optical connector comprising: a housing 21, a ferrule having an optical fiber secured thereinside and a flat tip end face capable of optical connection with another optical component, a connection mechanism located at a rear end side of said ferrule opposite to said tip end face, for positionally aligning and butt connecting and clamping a portion of said optical fiber protruding from a rear end of said ferrule and another optical fiber to thereby maintain a connected condition, said connection mechanism comprises: a hilt portion protruding rearward from the ferrule, a cover which together with the hilt portion clamps therebetween the pair of optical fibers to be butt connected, an alignment device for positionally aligning the pair of optical fibers to be connected between the hilt portion and the cover so as to be able to abut against each other, clamping force applying means for applying a clamping force to said hilt portion and said cover for clamping said optical fibers, and an insertion opening for insertion of a release member for pressing between and opening said hilt portion and said cover against an biasing force of said clamping force applying means, and said insertion opening is opened to the side along an alignment axis direction of the optical fiber.

2. An optical connector according to claim 1, wherein said clamping force applying means is a spring material for clamping said hilt portion and said cover with said biasing force.

3. An optical connector according to claim 1, wherein said connection mechanism comprises, said hilt portion protruding from a ferrule holder fixed to said ferrule, and a plurality of covers which together with said hilt portion clamp therebetween said optical fiber, and said covers can be individually displaced with respect to said hilt portion.

4. A housing for an optical connector constructed so as to be able to accommodate a ferrule having an optical fiber secured thereinside and a flat tip end face capable of optical connection with another optical component, said housing comprises:

thereinside an engagement protrusion for accommodation in a location groove formed in a ferrule holder fixed to said ferrule, and a ring portion accommodating socket for accommodating a ring portion protruding from said ferrule holder; and an inclined lip for engaging with a ring-shape protruding portion protruding from a stop ring for accommodating a connection mechanism assembled at a rear end side of said ferrule opposite to said tip end face; and said connection mechanism being constructed so as to positionally align and clamp said optical fiber protruding from a rear end portion of said ferrule and another optical fiber to thereby maintain an butt connected condition, wherein, when said stop ring accommodating said connection mechanism is inserted, assembly is effected by accommodating said engagement protrusion in said location groove of said ferrule, accommodating said ring portion in said ring portion accommodating socket, and engaging said ring-shape protruding portion with said inclined lip.

5. An optical connector comprising: a ferrule having an optical fiber secured thereinside and a flat tip end face capable of optical connection with another optical component, a connection mechanism for positionally aligning and butt connecting and clamping said optical fiber protruding from a rear end side of said ferrule opposite to said tip end face and another optical fiber to thereby maintain a connected condition, and a housing for accommodating said ferrule, and an insertion opening for insertion of a release member for opening and closing said connection mechanism is opened on a side face.

6. An optical connector comprising: a housing, a ferrule having an optical fiber secured thereinside and a flat tip end face capable of optical connection with another optical component, a connection mechanism located at a rear end side of said ferrule opposite to said tip end face, for positionally aligning and butt connecting and clamping a portion of said optical fiber protruding from a rear end of said ferrule and another optical fiber to thereby maintain a connected condition, a push-in control member which abuts with the ferrule when pushed rearwards in said housing to set a maximum push-in position, and biasing means for exerting an biasing force on said ferrule towards a tip end of said housing, with a reaction force being taken by said housing or said push-in control member, and said connection mechanism comprises: a bifurcated construction component section, an alignment device housed inside said component section for aligning and positioning the pair of optical fibers to be connected so as to be able to be butt connected, clamping force applying means for applying a clamping force to said component section for clamping optical fibers clamped in said component section, and an insertion opening for insertion of a release member for pressing and opening said component section against an biasing force of said clamping force applying means, and said insertion opening is opened to the side along an alignment axis direction of the optical fiber, and said biasing means is located at a rear end side of said connection mechanism opposite to said ferrule, and applies an biasing force on said ferrule via said connection mechanism, and said release member can be inserted into and removed from said component section while avoiding said biasing means.

7. An optical connector according to claim 6, wherein said component section of said connection mechanism comprises: a hilt portion protruding from the rear side of a ferrule retaining part for retaining said ferrule, a cover which together with said hilt portion clamps therebetween the pair of optical fibers to be butt connected, and an alignment device for positionally aligning the pair of optical fibers to be connected between the hilt portion and the cover so as to be able to abut against each other, and by inserting said release member this presses and opens between the hilt portion and the cover against an biasing force of the clamping force applying means.

8. An optical connector according to claim 7, wherein said clamping force applying means is a spring material for clamping said hilt portion and said cover with an biasing force.

* * * * *

UNITED STATES PATENT AND TRADEMARK OFFICE
CERTIFICATE OF CORRECTION

PATENT NO.     : 6,179,482 B1                                           Page 1 of 1
DATED          : January 30, 2001
INVENTOR(S)    : Kazuhiro Takizawa et al.

It is certified that error appears in the above-identified patent and that said Letters Patent is hereby corrected as shown below:

<u>Title page,</u>
Add the following Assignee to item [73]: -- Nippon Telegraph and Telephone Corporation, Tokyo (JP) --

Signed and Sealed this

Twenty-fourth Day of December, 2002

JAMES E. ROGAN
*Director of the United States Patent and Trademark Office*